United States Patent [19]

Hays et al.

[11] 4,449,511

[45] May 22, 1984

[54] RECUPERATIVE FURNACE

[75] Inventors: Herbert G. Hays, Amana; Warren W. Kuipers, Cedar Rapids, both of Iowa

[73] Assignee: Amana Refrigeration, Inc., Amana, Iowa

[21] Appl. No.: 456,172

[22] Filed: Jan. 6, 1983

[51] Int. Cl.$^3$ .............................................. F24H 3/02
[52] U.S. Cl. ............................... 126/110 R; 126/101; 126/117; 165/DIG. 2; 237/55
[58] Field of Search ............. 126/99 R, 110 R, 110 E, 126/116 A, 116 B, 101, 117, 109; 237/8 R, 8 A, 19, 55; 122/20 A, 20 B, 33; 165/DIG. 2

[56] References Cited

U.S. PATENT DOCUMENTS

| | | | |
|---|---|---|---|
| 2,373,731 | 4/1945 | Wilson | 237/19 |
| 2,497,184 | 2/1950 | O'Brien | 126/101 |
| 2,789,769 | 4/1957 | Dalin | 126/101 |
| 2,827,893 | 3/1958 | Ribaudo | 126/101 |
| 3,833,170 | 9/1974 | Marshall | 126/101 |
| 3,896,992 | 7/1975 | Borovina | 237/8 R |
| 3,997,109 | 12/1976 | Hays | 237/8 R |
| 4,037,786 | 7/1977 | Munroe | 237/19 |
| 4,066,210 | 1/1978 | Pemberton | 165/DIG. 2 |
| 4,090,492 | 5/1978 | Simmons | 126/101 |
| 4,122,999 | 10/1978 | Belcastro et al. | 236/11 |
| 4,143,816 | 3/1979 | Shadeland | 237/8 R |
| 4,158,386 | 6/1979 | Hapgood | 126/101 |
| 4,178,907 | 12/1979 | Sweat, Jr. | 126/101 |
| 4,194,558 | 3/1980 | Goosman | 165/105 |
| 4,261,326 | 4/1981 | Ihlenfield | 126/110 R |
| 4,371,111 | 2/1983 | Pernosky | 237/8 R |

*Primary Examiner*—Daniel J. O'Connor
*Attorney, Agent, or Firm*—William R. Clark; Joseph D. Pannone

[57] ABSTRACT

A recuperative furnace and method for heating wherein the recirculation air blower directs the return air upwardly first to a recuperative heat exchanger and then to a second heat exchanger operating from the heat of combustion. The flue gases are routed directly to the recuperative heat exchanger where a portion of the products of combustion condense. Accordingly, the recuperative heat exchanger not only provides sensible heat transfer from the flue gases but also recovers a portion of the latent heat of vaporization. The second heat exchanger transfers heat from a solution to the recirculation air. The solution flows through a closed loop between the second heat exchanger and a heat transfer module which includes the burner.

8 Claims, 7 Drawing Figures

RECUPERATIVE FURNACE

BACKGROUND OF THE INVENTION

It is well known that it requires 538 calories to convert one gram of water at 212° F. to steam at the same temperature. Once the heat is absorbed in the conversion process from liquid to gas, it is referred to as latent heat of vaporization. Upon condensing, an equivalent amount of heat is given off and, not suprisingly, it is referred to as heat of condensation.

It is common knowledge in the art that residential exhausting flue gases at relatively high temperatures such as, for example, 500° F., represent a substantial amount of heat loss to the outside. By extracting heat from the flue gases before exhausting them, not only is sensible heat recovered but the lowering in temperature also results in condensation of the products of combustion and recovery of some of the latent heat of vaporization. Furnaces which recover sensible heat and a portion of the latent heat of vaporization from the flue gases before exhausting them to the outside have been referred to as recuperative or condensing furnaces.

Because of the substantial losses through the stack of a non-condensing furnace, the maximum efficiency for these systems is generally considered to be in the range from 75–85%. On a seasonal basis, this efficiency range is reduced because useable heat is also lost up the chimney through a draft hood during the cool-down period at the end of each heating cycle. Condensing or recuperative furnaces, on the other hand, are not substantially limited by these two factors and accordingly, efficiencies substantially above 90% are attainable. With the rapid rise in cost of fuel in recent years, the efficiency of a furnace has been much more important.

U.S. Pat. No. 4,178,907 shows a forced air heating system wherein the flue gases are channelled through a heat exchanger to remove heat therefrom before exhausting to the outside. In this system, the recirculating air from the intake duct passes first across a heat exchanger operating from the heat of combustion and then past the heat exchanger receiving the flue gases. A disadvantage of this system is that when the recirculating air comes in contact with the flue gas heat exchanger, the air has already been heated by the other heat exchanger. Accordingly, the temperature differential between the recirculating air and the flue gases is reduced thereby substantially decreasing the thermal transfer from the flue gases. Stated differently, recovery of sensible heat and latent heat of vaporization from the flue gases will not be at the same high rate as if the recirculating air were at a lower temperature.

U.S. Pat. No. 4,122,999 also shows a forced air heating system wherein some of the heat is extracted from the flue gases before they are exhausted to the outside. The flue gases first pass through a heat exchanger which is positioned within the hot air duct and then through a second heat exchanger positioned in the return air duct to the recirculation blower. This system, however, does not provide optimum fuel efficiency.

U.S. Pat. No. 4,261,326 discloses a three cell furnace wherein two of the cells have a burner and the third cell operates as a heat exchanger to extract heat from the flue gases before exhausting from the system. With this system, however, as described earlier, the recirculation air does not pass over the recuperative heat exchanger first; rather, it passes across all three cells in parallel. Accordingly, the extraction of heat from the recuperative cell is not at optimum efficiency.

SUMMARY OF THE INVENTION

The primary object of the invention is to provide a compact high efficiency furnace having a recuperator to preheat return air before the air is more typically heated prior to introduction into the home or other enclosure.

Another object of the invention is to provide a totally integrated high efficiency furnace system that does not require any changes or additions to conventional connecting air ducts used by noncondensing furnaces. Stated differently, an object of the invention is to provide a recuperative furnace in which the recuperative heat exchanger is a part of the furnace as opposed to a modification of the external duct work or the like.

Another object of the invention is to provide a recuperative furnace with a recuperative heat exchanger positioned in the path of incoming air to preheat the air before the air is directed further upwards to be heated by other means to the final temperature.

Still another object of the invention is to maximize the extraction of usable heat from a fuel that is combusted.

Another object of the invention is to provide a recuperative heat exchanger in a recuperative furnace constructed of stainless steel and positioned between a centrifugal air mover and a liquid-to-air heat exchanger to efficiently preheat incoming air.

A further object is to provide a recuperative furnace designed and constructed so that the products of combustion are channeled through a recuperative heat exchanger to reduce the sensible and latent heat otherwise lost to the environment. Further, it may be important to provide a recuperative furnace that may be installed in place of a conventional furnace without the need for a conventional chimney.

These and other objects and advantages are provided by the invention which defines a forced air furnace, comprising means for combusting fuel, a first heat exchanger coupled to receive heat of combustion from the combusting means, a second heat exchanger coupled to receive products of combustion directly from the combusting means, an air blower having its output coupled to the second heat exchanger for preheating the air from thermal transfer from the products of combustion and from heat of condensation given off by a portion of the products of combustion condensing in the second heat exchanger, and the preheated air from the second heat exchanger being coupled to the first heat exchanger for further heating of the preheated air by thermal transfer from the first heat exchanger. It may be preferable that the second heat exchanger be of tube and fin construction. Further, it may be preferable that an air duct housing be provided to enclose the first and second heat exchangers wherein the first heat exchanger is positioned above the second heat exchanger and the air blower be positioned below the second heat exchanger. Also, it may be preferable that the heat of combustion be transferred from the combusting means to the first heat exchanger by a fluid recirculating therebetween.

The invention may also be practiced by a forced air furnace, comprising means for combusting fuel, a first heat exchanger positioned in thermal communication with the heat of combustion of the combusting means, the first heat exchanger transferring heat from the heat of combustion to a fluid, a second heat exchanger, means for recirculating the fluid between the first and second heat exchangers, a third heat exchanger communicating with the combusting means wherein the products of combustion from the combusting means are passed through the third heat exchanger, an air blower having its output coupled to the third heat exchanger for preheating the air from thermal transfer from the products of combustion and from heat of condensation resulting from a portion of the products of combustion condensing within the third heat exchanger, and the preheated air from the third heat exchanger being coupled to the second heat exchanger for thermal transfer from the fluid.

The invention also defines a forced air furnace, comprising a burner for combusting fuel, a first heat exchanger positioned in thermal communication with the heat of combustion of the burner, the first heat exchanger transferring heat from the heat of combustion to a fluid, a vertical air duct, a second heat exchanger positioned within the air duct, means for recirculating the fluid between the first and second heat exchangers, a third heat exchanger positioned within the air duct below the second heat exchanger, the third heat exchanger receiving products of combustion from the burner, an air blower positioned below the duct and communicating therewith wherein air from the blower is directed upwards through the duct, said air being preheated by thermal transfer from the products of combustion and from heat of condensation given off by a portion of the products of combustion condensing within the third heat exchanger, and the preheated air from the third heat exchanger being further heated by thermal transfer from the fluid in the second heat exchanger.

The invention discloses a residential forced air furnace, comprising a burner for combusting fuel, a first heat exchanger positioned in thermal communication with the heat of combustion of the burner, the first heat exchanger transferring heat from the heat of combustion to a fluid, a vertical air duct, a second heat exchanger positioned within the air duct, means for recirculating the fluid between the first and second heat exchangers, the recirculating means comprising a pump, a third heat exchanger positioned within the air duct below the second heat exchanger, the third heat exchanger receiving products of combustion directly from the burner, the third heat exchanger comprising a plurality of stainless steel tubes surrounded by thermal transfer fins, the ends of the tubes respectively communicating with stainless steel input and exhaust manifolds, the exhaust manifold communicating with a flue pipe, an air blower positioned below the duct and communicating therewith wherein return air from the surrounding is directed upwards through the duct, the air being preheated by thermal transfer from products of combustion and from heat of condensation given off by a portion of the products of combustion condensing within the third heat exchanger, and the preheated air from the third heat exchanger being further heated by thermal transfer from the fluid in the second heat exchanger.

The invention may further be practiced by the method of providing forced hot air for heating a residential enclosure, comprising the steps of burning fuel, directing the products of combustion from the fuel directly to a tube and fin recuperative heat exchanger, transferring heat of combustion to a fluid, circulating the fluid to a second heat exchanger, directing return air from the enclosure across the fins of the recuperative heat exchanger to preheat the air by thermal transfer from the products of combustion and from heat of condensation resulting from the products of condensing within the recuperative heat exchanger, and directing the preheated air to the second heat exchanger for further heating before being forced back to the enclosure.

BRIEF DESCRIPTION OF THE DRAWINGS

The foregoing and other objects and advantages of the invention will be more readily understood by reading the Description of the Preferred Embodiment wherein.

DESCRIPTION OF THE PREFERRED EMBODIMENT

Figure 1:
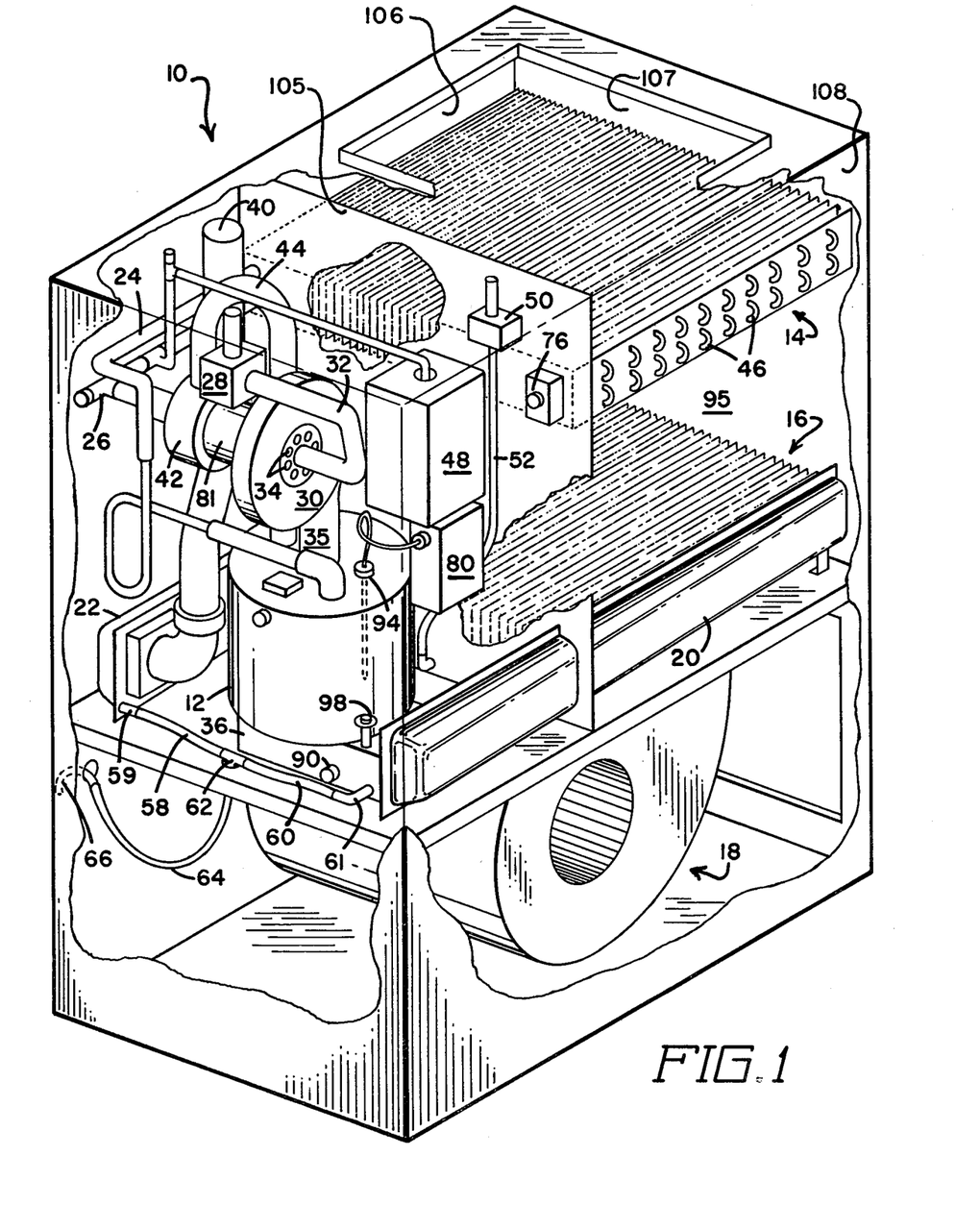
FIG. 1 is an illustrative, partially broken away perspective view of a recuperative furnace embodying the invention.

Referring now to the drawings, wherein like numerals refer to the like parts, and more particularly to FIG. 1, there is shown in a partially broken away, perspective view a recuperative furnace 10. Furnace 10 is broadly made up of a burner and heat exchange module 12, a secondary heat exchanger 14, a recuperative heat exchanger 16 and a blower assembly 18. Module 12 is connected to recuperative heat exchanger or recuperator 16 by conduit 36 and manifold 20. Module 12 is connected to secondary heat exchanger 14 by solution lines 24 and 26.

Figure 2:
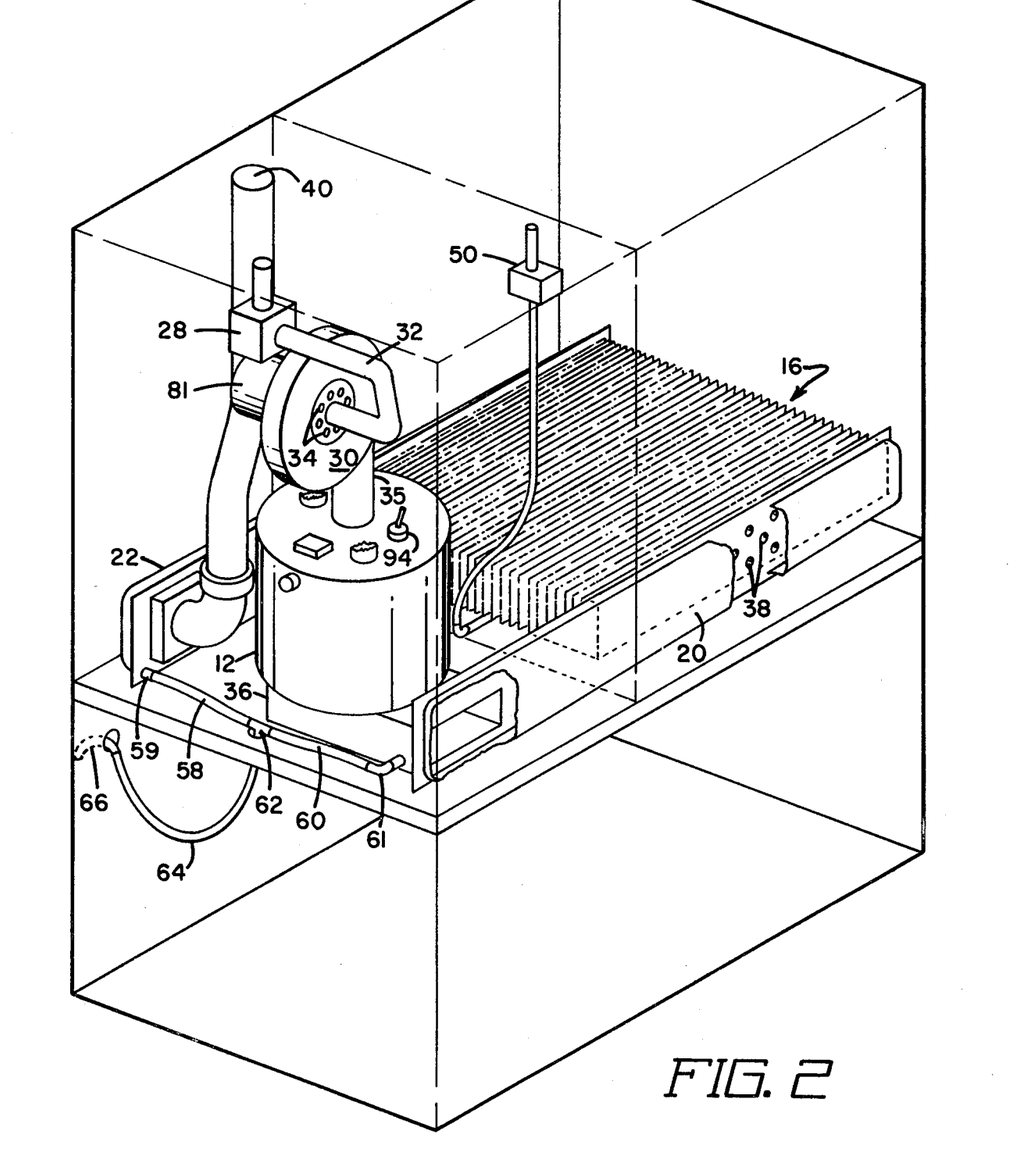
FIG. 2 is a perspective view of FIG. 1 with some of the parts omitted thereby illustrating the recuperative heat exchanger and associated water flushing system.

The flow of fuel and flue gases may best be seen in FIG. 2 wherein, for illustration, the view of FIG. 1 is shown with some of the parts omitted. Upon a call for heat and in accordance with the controls of the furnace as will be described in detail later herein with particular reference to FIG. 7, electricity flows through a ceramic ignitor tip (not shown) heating it to approximately 2,500° F. Then, combustion air blower 30 is activated and fuel valve 28 is opened. Blower 30 mixes a gas and air mixture with the gas being provided from conduit 32 running from valve 28 and the air being supplied through apertures 34. From blower 30, the air and fuel mixture is forced via duct 35 into module 12. As the mixture passes over the hot ignitor tip, ignition occurs and combustion begins. The detailed construction of module 12 and secondary heat exchanger 14 and their related operation may be fully understood from U.S. Pat. Nos. 3,936,003; 3,967,590; 3,997,109, 4,135,487 and 4,171,772, which are hereby incorporated by reference.

The products of combustion are exhausted downwardly from module 12 into conduit 36. For reasons to be discussed later herein, module 12 is inverted from what may heretofore have been considered its standard configuration. The combustion by-products travel along manifold 20 and into tubes 38 within recuperator 16. Recuperator 16 is of fin and tube construction as is well known in the art.

Within tubes 38, the combustion by-products are partially condensed and accordingly, part of the latent heat of water vapor is recovered. The remaining gases flow out tubes 38 and into manifold 22. From manifold 22, the gases are exhausted from the furnace through vent pipe 40. The flue gases may then be exhausted from the home or other enclosure in much the same fashion as conventional furnaces or even conventional laundry equipment, i.e., there is no need for extensive chimneys or the like since the exhaust temperatures are typically in the range of 100° to 120° F.

Figure 3:
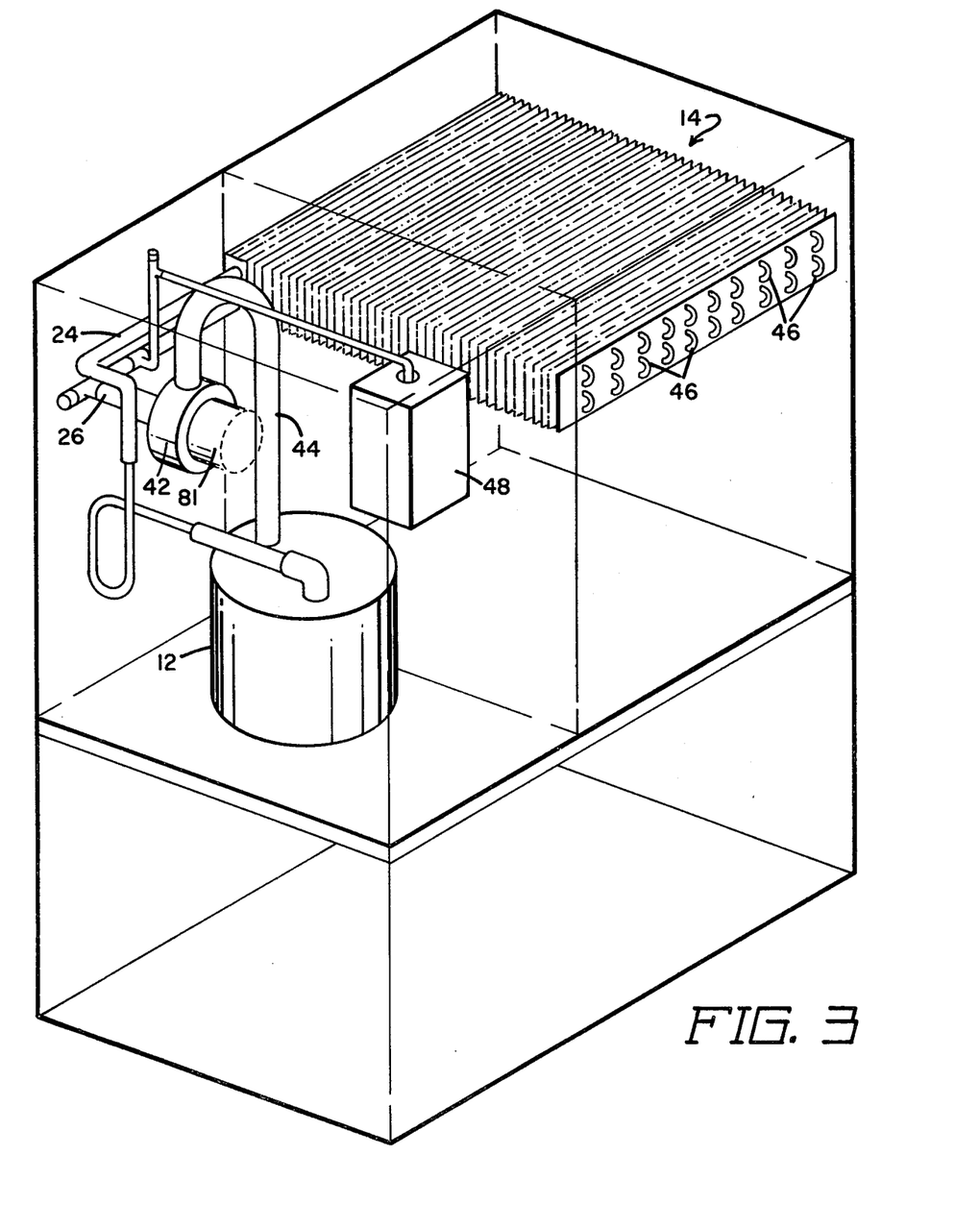
FIG. 3 is a perspective view of FIG. 1 with some of the parts omitted thereby illustrating the closed loop for solution between the primary and secondary heat exchangers.

Turning now to FIG. 3, wherein, for illustration, the view of FIG. 1 is shown with some of the parts omitted, the flow of the primary heat exchange medium will be described. Upon a call for heat and in accordance with the controls of the furnace as will be described in detail later herein with particular reference to FIG. 7, solution pump 42 is activated. Pump 42 is connected at its inlet to line 26 which communicates with tubes 46 of secondary heat exchanger 14. At its outlet, pump 42 is connected by line 44 to module 12. Line 44 communicates with tubes (not shown) passing through module 12 and the closed loop back to tubes 46 of the secondary heat exchanger is completed by line 24. As is well known in the art, in conjunction with lines 24, 26, and 44, a solution such as ethylene or propylene glycol and water is circulated in a closed loop between module 12 which is considered the primary heat exchanger and secondary heat exchanger 14. Heat which is added to the solution by combustion within module 12 is given off in secondary heat exchanger 14.

If for any reason the furnace malfunctions or exceeds its temperature limits or the solution expands beyond the capacity of the closed loop between module 12 and secondary heat exchanger 14, the solution overflows to atmospheric overflow tank 48 which functions in a similar manner to the overflow tanks that are in common use in many automobile radiator systems. In general, tank 48 acts as a reserve to accomodate any excess solution volume such as may be caused by thermal expansion.

As mentioned earlier herein, a condensate is formed in the recuperative heat exchanger or recuperator 16 as the combustion by-products cool therein. The removal and flushing of such condensate to overcome the problem of corrosion is best described with reference to FIGS. 2, 4, 5 and 6. Firing continuously, recuperative heat exchanger 16 may yield approximately three quarts of condensate per hour which corresponds to a substantial amount of recuperated latent heat of vaporization. Tubes 38 of recuperator 16 may be sloped downwardly towards respective manifolds 20 and 22 so as to accelerate the drainage of condensate. Further, manifolds 20 and 22 may be attached with a downward slope towards the front of furnace 10 so that condensate will rapidly drain towards lines 58 and 60, respectively, as shown best in FIG. 4. Lines 58 and 60 are joined at junction 62 so that liquid from respective manifolds 20 and 22 flows out of furnace 10 through trap 64. The condensate is removed from furnace 10 through elbow 66 which is connected to trap 64. The height of elbow 66 from the base of furnace 10 is important. If it is lower than the low point in trap 64, lines 58 and 60 and trap 64 will totally drain. If this happened, uncondensed flue gases remaining in manifold 22 would have an alternate path to the outside. Instead of being exhausted out vent pipe 40, the flue gases could escape through elbow 66. The result could be an accumulation of undesirable gases within the enclosure to be heated. If, on the other hand, elbow 66 is placed higher than drain 61, the diluted condensate will not properly drain from furnace 10, and manifolds 20 and 22 will retain excess liquid, restricting their volume and thereby affecting their performance. The most convenient means of disposal of the condensate from elbow 66 is in the domestic sanitary drain system where hundreds of gallons of waste water flow each day. Under normal conditions, the mildly acidic condensate is diluted and buffered by the normal sanitary system effluent.

Figure 5:
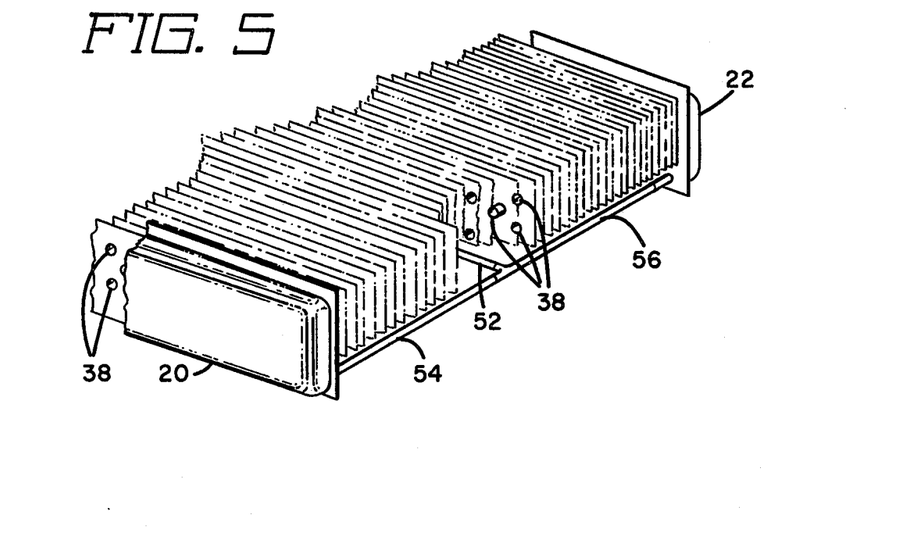
FIG. 5 is a rear perspective, partially broken out view of the recuperative heat exchanger and related condensate draining and water flushing system.

Manifolds 20 and 22 and tubes 28 are fabricated of stainless steel to resist corrosion by the mildly acidic condensate. Furthermore, at the end of each heating cycle, fresh water is flushed through the manifolds and out the drain to wash away residual condensate. More specifically, referring first to FIG. 2, a source of tap water is connected to water valve 50. Upon a call for water after a heating cycle as will be described in more detail later herein, water flows through line 52 down and underneath to the rear of recuperator 16 as shown in FIG. 5. At the rear of recuperator 16, line 52 branches into lines 54 and 56. Line 54 supplies water to manifold 20. Line 56 supplies water to manifold 22. The flushing water containing diluted residual condensate flows along the same path as described earlier herein for the condensate. More specifically, the flush flows forward in respective manifolds 20 and 22 and lines 58 and 60 and exits through trap 64 and elbow 66.

Figure 4:
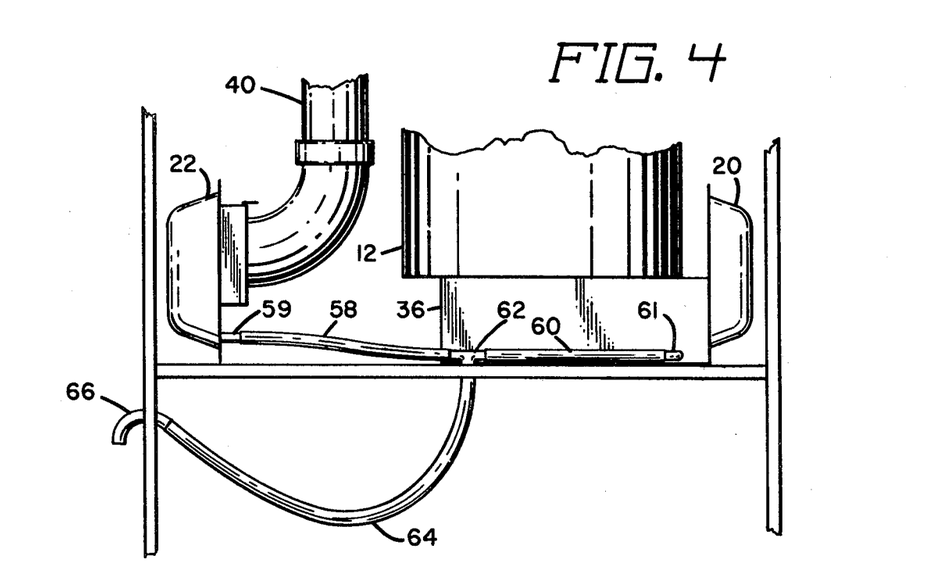
FIG. 4 is a front view of the central portion of the furnace of FIG. 1 showing draining apparatus.
Figure 6:
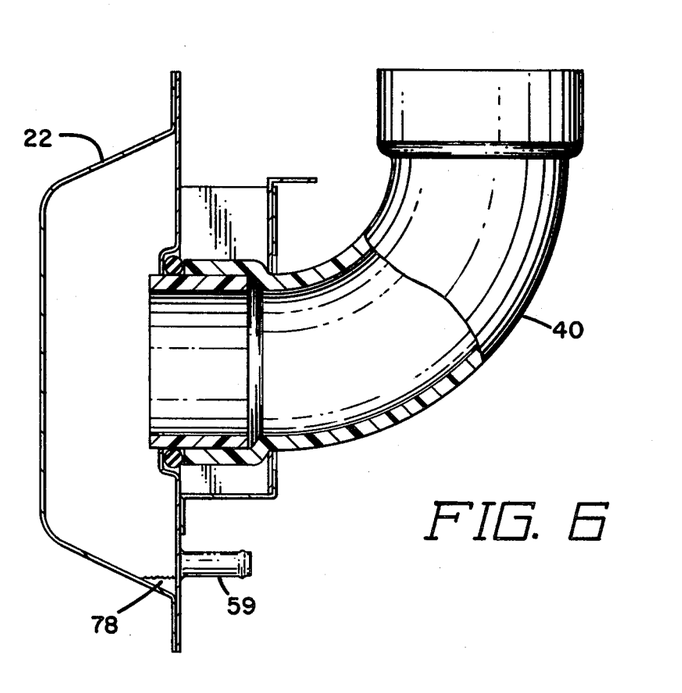
FIG. 6 is a front, partially broken away view of the connection between manifold 22 and flue 40.

As shown in FIGS. 4 and 6, lines 58 and 60 are connected to manifold 22 and conduit 36 at drains 59 and 61, respectively, slightly above their internal floors. This allows tap water 78 to remain standing in the manifolds at all times to provide two advantages. First, it insures that any condensate not washed out during the flushing process will be diluted by the remaining tap water. Second, it insures that any condensate flowing into the manifolds from recuperator 16 or vent pipe 40 after the flushing process has been completed will still be diluted.

Figure 7:
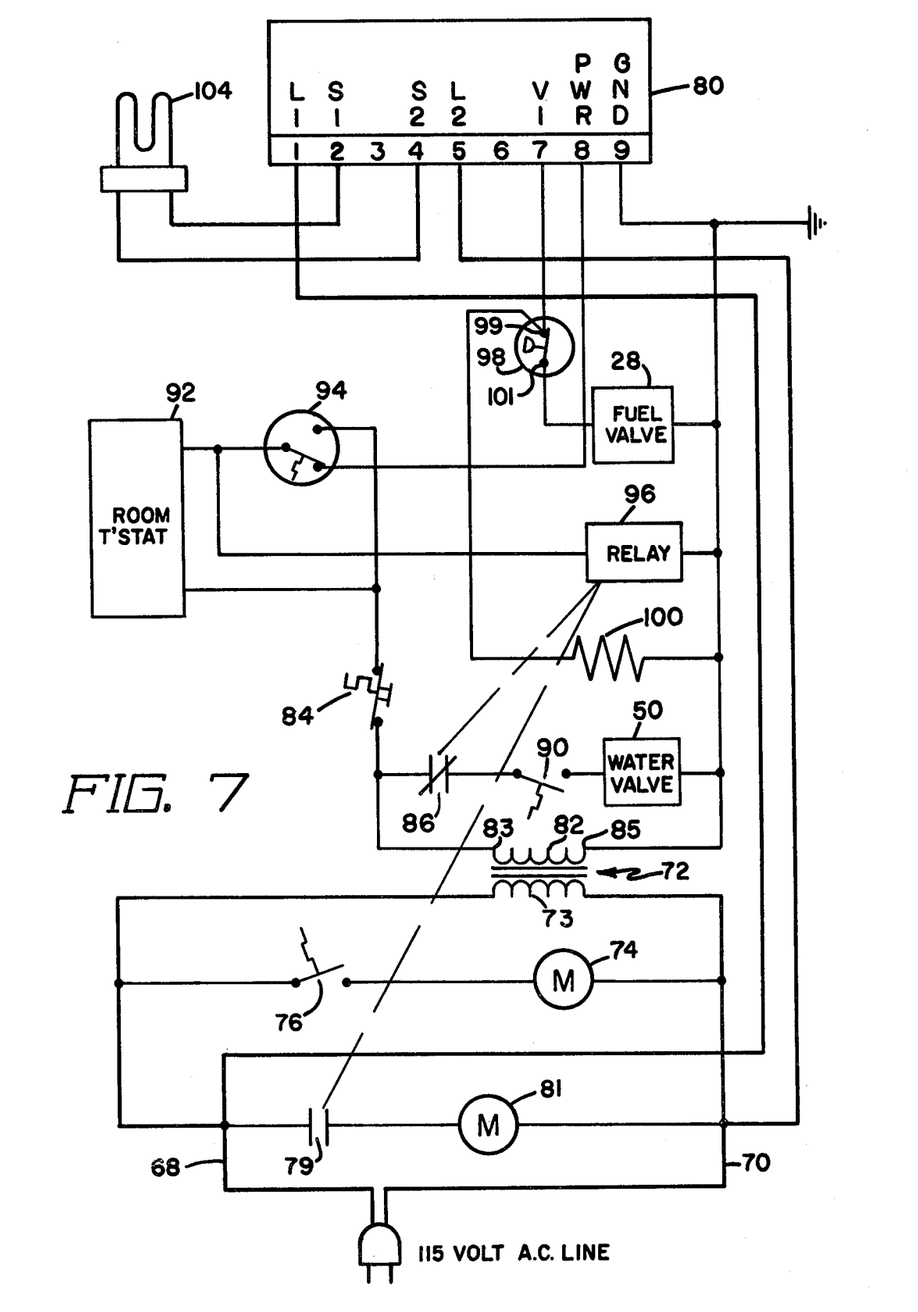
FIG. 7 is an illustrative electrical schematic for the controller of the recuperative furnace of FIG. 1.

Referring to FIG. 7, there is shown an illustrative electrical schematic which functions as the controller for the recuperative furnace of FIG. 1. Terminals 68 and 70 are connected to a standard household 115 volt ac source as shown. Accordingly, the ac voltage appears across the series of combustion air blower/pump motor 81 and combustion air blower/pump contacts 79 which are normally open, the series of blower motor 74 and blower control contacts 76 which are temperature activated and normally open, the primary winding 73 of stepdown transformer 72, and terminals 1 and 5 of ignition control 80. The voltage across the secondary winding 82 of stepdown transformer 72 is reduced to approximately 24 volts. This secondary voltage appears across the series of water valve 50, normally closed contacts 86, and normally open temperature activated contacts 90. Further, side 83 of secondary winding 82 is connected through a secondary limiter 84 which consists of manually reset normally closed temperature activated contacts 84 to one terminal of room thermostat 92 and one switch terminal of water limiter 94 which consists of single pole double throw temperature activated contacts 94 as shown. The opposite switch terminal of water limiter 94 is connected to power input terminal 8 of ignition control 80. The second terminal of room thermostat 92 is an input to water limiter 94 and relay 96. Side 85 of secondary winding 82 is connected through blower control resistance heater 100 to terminal 99 of pressure switch 98, to the second terminal of relay 96, through fuel valve 28 to terminal 101 of pressure switch 98, and to grounded terminal 9 of ignition control 80. Terminal 7 of ignition control 80 is connected to terminal 99 of pressure switch 98. Further, ignitor 104 which was described earlier as a ceramic electronic ignitor trip is connected across terminals 2 and 4 of ignitor control 80. The components described herein with reference to FIG. 7 are conventional and well known in the art. For example, although the functions of ignition control 80 as described herein could be performed using a plurality of relays, it may be preferable to use a solid state device which is commercially available from Fenwal Inc., Division of Kidde, Inc., of Ashland, MA, as catalogue order No. 05-212225-107. Also, ignitor 104 is commercially available as Model No. 201A from Norton Company of Milford, NH.

Upon call for heat from room thermostat 92 as mentioned earlier herein, contacts internal thereto close allowing current to flow from secondary winding 82, through secondary limiter 84, thermostat 92, and water limiter 94 thereby energizing the power terminal of ignition control 80. Current also flows from room thermostat 92 activating relay 96. The activation of relay 96 opens normally closed contacts 86 and closes normally open contacts 79.

Closing contacts 79 completes the line voltage circuit through motor 81 that drives both the solution pump 42 and the combustion air blower 30. Accordingly, pump 42 begins to circulate the ethylene or propylene glycol and water mixture through the closed loop piping as described earlier herein. Also, blower 30 commences operation and creates a negative pressure at the outlet of fuel valve 28.

The energizing of ignition control 80 causes ignitor 104 to be energized by internally connecting pin 1 to pin 2 and pin 4 to pin 5 within ignition control 80.

After a time delay in which ignitor 104 heats to its specified ignition temperature, ignition control 80 opens fuel valve 28 and energizes blower control resistance heater 100 by internally providing power from pin 8 to pin 7. Pin 7 is connected to fuel valve 28 through pressure switch 98.

Activation of fuel valve 28 allows gas to be drawn into blower 30 for mixture with air which enters through apertures 34. The fuel and air mixture is then forced into module 12 where it is ignited by ignitor 104. Some desirable safety interlocks are not described herein because they form no part of the invention. The ignition and burning of the mixture provides heat which is transferred to the ethylene or propylene glycol and water mixture simultaneously flowing through module 12.

When blower control resistance heater 100 has reached a predetermined temperature, blower control contacts 76, which are in heat exchange relationship with heater 100, close to complete a line voltage circuit through blower motor 74. Motor 74 turns blower assembly 18 to move return air through furnace 10 as shown in FIG. 1. Cool air returning from the home or other enclosure to be heated is drawn into the blower assembly 18 from a return air duct, not shown. It typically may be at a temperature of 67° F.

The air is typically preheated or warmed by passage through tube and fin recuperative heat exchanger 16° to 77° F. The high efficiency of furnace 10 is in part a result of the recuperative process wherein flue gases are exhausted at a relative low temperature, such as, for example, in the range from 100° F. to 120° F. In non-recuperative furnaces, as is well known in the art, flue gases may be exhausted at temperatures on the order of 500° F. which substantially reduces the efficiency due to the lost heat. In accordance with the invention, not only is sensible heat extracted from the flue gases by recuperator 16, but also latent heat is recovered by the condensation of flue gases. Because the relatively cool return air passes over recuperative heat exchanger 16 first, recovery of latent heat of vaporization by condensation is enhanced. Heat is transferred to the air which is forced through recuperator 16 by blower 30.

After being preheated by recuperator 16, the air continues upward in duct 95 formed by front wall 105, back wall 107, and side walls 106 and 108. Duct 95 channels the air through secondary heat exchanger 14. The temperature of the air may typically be elevated to approximately 136° F. by heat transferred from the heated glycol and water mixture flowing through the fin and tube construction of heat exchanger 14. From heat exchanger 14, the air may be forced through conventional duct work to the enclosure or home to be heated.

When room thermostat 92 is satisfied, the secondary voltage circuit through it is opened thereby removing power to ignition control 80 and relay 96. When power is removed from ignition control 80, ignitor 104 is deactivated and fuel valve 28 closes. When power is removed from relay 96, contacts 79 are opened and contacts 86 are closed. The opening of contacts 79 interrupts the ac line voltage circuit across motor 81 thereby removing drive to solution pump 42 and combustion air blower 30. The closing of contacts 86 provide secondary voltage to the series of contacts 90 and water valve 50.

Contacts 90 which function as a thermal switch are physically located on conduit 36. When heated by the flow of combustion by-products through conduit 36 during operation of furnace 10, contacts 90 close. Therefore, when contacts 86 close by the deactivation of relay 96, water valve 50 is energized allowing tap water to flow through line 52 as previously described. The flow of water through recuperator 16 continues until conduit 36 cools to a predetermined temperature and then temperature activated contacts 90 open to terminate the condensate flushing process.

Similarly, motor 74 continues to drive blower assembly 18 to force heated air into the home or other enclosure to be heated until blower control contacts 76 open. Blower control contacts 76 are in heat exchange relationship with secondary heat exchanger 14 and sense the temperature of exchanger 14. As with contacts 90, control contacts 76 open at a predetermined temperature.

Water limiter 94 and pressure switch 98 are safety devices designed to prevent furnace 10 from operating under unusual circumstances. Water limiter 94 is a commercially available thermal switch. It is positioned within module 12 as shown in FIG. 1. In the unlikely event of a loss of glycol and water mixture or other cause for overheating of module 12, water limiter 94 de-energizes ignition control 80 and, instead, only relay 96 is powered. This continues the circulation of cooling solution through module 12. Water limiter 94 automatically resets when a predetermined temperature is reached.

Switch 98 is a pressure activated switch located on conduit 36 as shown in FIG. 1. In the unlikely event of excessive back pressure within conduit 36 caused by a blocking of vent 40 or excessive condensate build up within manifold 22 or the like, switch 98 opens. This de-energizes fuel valve 28 thereby cutting off the flow of fuel for combustion into module 12.

As has been described, the air recirculation blower 18 first directs the return air to recuperative heat exchanger 16. This is important to provide maximum temperature differential between the recirculation air and the flue gases. Accordingly, maximum transfer of sensible heat from the flue gases and maximum recovery of latent heat of vaporization by condensation is attained. Stated differently, the relatively cool return air, which may be at approximately 67° F., keeps the fins 39 of recuperative heat exchanger 16 at a relatively cool temperature thus enhancing condensation and its associated thermal transfer within tubes 38. Furthermore, it is next preferable that the recirculation air preheated by recuperative heat exchanger 16 flow upwardly to secondary heat exchanger 14; to direct the recirculation air in any other direction would be operating against the natural flow of the heated air. As stated earlier herein, module 12 is inverted from what has heretofore been considered it standard configuration. More specifically, the fuel is injected into the top of module 12 and the products of combustion are exhausted from the bottom. Accordingly, the closed loop circulating the ethylene or propylene glycol and water solution to secondary heat exchanger 14 at the top can be configured as shown while the flue gases are routed horizontally through conduit 36 and manifold 20 to recuperative heat exchanger 16 on the bottom. If the flue gases were routed downwardly to recuperative heat exchanger 16, undesirable back pressure could be created on module 12. If the flue gases were exhausted from the top of module 12, and then routed horizontally to recuperative heat exchanger 16 on the bottom, the module would be positioned in enclosure 19 of blower 18 thus interfering with the operation of blower 18 and complicating the design of the solution lines to secondary heat exchanger 14. In short, with the parts configured as shown in the drawings and described herein, the objectives of the invention were attained and high efficiency was provided. Also, the furnace is extremely compact.

Although furnace 10 has been described with respect to specific details of certain preferred embodiments, it is not intended or required that such details limit the scope of the invention as set forth in the following claims. It will be apparent that various modifications and changes may be made by those skilled in the art without departing from the spirit of the invention as expressed in the accompanying claims. Hence, all matters shown and described are intended to be interpreted as illustrative and not in a limiting sense.

What is claimed is:

1. A forced air furnace, comprising:
    means for combusting fuel;
    a first heat exchanger positioned in thermal communication with the heat of combustion of said combusting means, said first heat exchanger transferring heat from said heat of combustion to a fluid;
    a second heat exchanger;
    means for recirculating said fluid between said first and second heat exchangers;
    a third heat exchanger communicating with said combusting means wherein products of combustion from said combusting means are passed through said third heat exchanger;
    an air blower having its output coupled to said third heat exchanger for preheating said air from thermal transfer from said products of combustion and from heat of condensation resulting from a portion of said products of combustion condensing within said third heat exchanger; and
    said preheated air from said third heat exchanger being coupled to said second heat exchanger for thermal transfer from said fluid.

2. The furnace recited in claim 1 wherein said third heat exchanger comprises a plurality of tubes surrounded by thermal transfer fins.

3. The furnace recited in claim 1 further comprising an air duct housing said second and third heat exchangers, said second heat exchanger being positioned above said third heat exchanger.

4. A forced air furnace, comprising:
    a burner for combusting fuel;
    a first heat exchanger positioned in thermal communication with the heat of combustion of said burner, said first heat exchanger transferring heat from said heat of combustion to a fluid;
    a vertical air duct;
    a second heat exchanger positioned within said air duct;
    means for recirculating said fluid between said first and second heat exchangers;
    a third heat exchanger positioned within said air duct below said second heat exchanger, said third heat exchanger receiving products of combustion from said burner;
    an air blower positioned below said duct and communicating therewith wherein air from said blower is directed upwards through said duct, said air being preheated by thermal transfer from said products of combustion and from heat of condensation given off by a portion of said products of combustion condensing within said third heat exchanger; and
    said preheated air from said third heat exchanger being further heated by thermal transfer from said fluid in said second heat exchanger.

5. The furnace recited in claim 4 wherein said third heat exchanger comprises a plurality of tubes surrounded by thermal transfer fins.

6. The furnace recited in claim 5 wherein said tubes are fabricated of stainless steel.

7. The furnace recited in claim 5 further comprising a stainless steel input manifold and a stainless steel exhaust manifold coupled to respective ends of said tubes.

8. A residential forced air furnace, comprising:
    a burner for combusting fuel;
    a first heat exchanger positioned in thermal communication with the heat of combustion of said burner, said first heat exchanger transferring heat from said heat of combustion to a fluid;
    a vertical air duct;
    a second heat exchanger positioned within said air duct;
    means for recirculating said fluid between said first and second heat exchangers, said recirculating means comprising a pump;
    a third heat exchanger positioned within said air duct below said second heat exchanger, said third heat exchanger receiving products of combustion directly from said burner, said third heat exchanger comprising a plurality of stainless steel tubes surrounded by thermal transfer fins, the ends of said tubes respectively communicating with stainless steel input and exhaust manifolds;

said exhaust manifold communicating with a flue pipe;

an air blower positioned below said duct and communicating therewith wherein return air from the surrounding is directed upwards through said duct, said air being preheated by thermal transfer from products of combustion and from heat of condensation given off by a portion of said products of combustion condensing within said third heat exchanger; and said preheated air from said third heat exchanger being further heated by thermal transfer from said fluid in said second heat exchanger.

* * * * *